Dec. 4, 1923.

E. ROUČKA 1,476,183

DEVICE FOR TRANSMITTING POSITIONS OF INDICATING ORGANS

Filed Aug. 16, 1921

INVENTOR
Emil Roučka

Dec. 4, 1923.
E. ROUČKA
DEVICE FOR TRANSMITTING POSITIONS OF INDICATING ORGANS
Filed Aug. 16, 1921
1,476,183
3 Sheets-Sheet 2
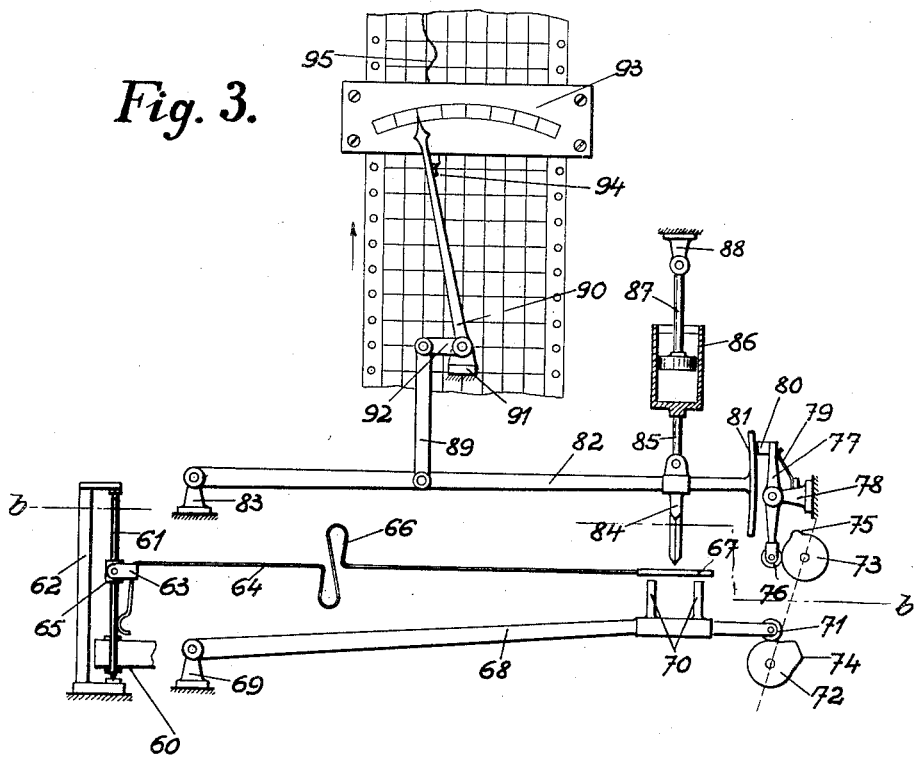
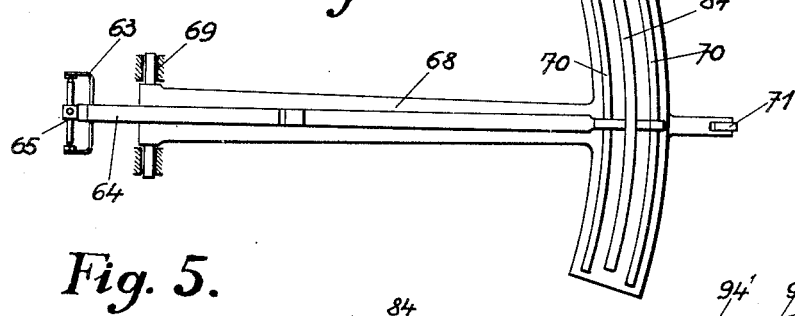
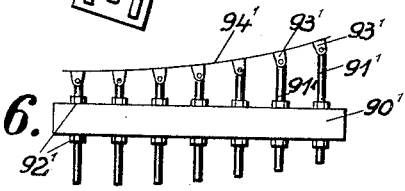
INVENTOR
Erich Roučka Dec. 4, 1923.

E. ROUČKA 1,476,183

DEVICE FOR TRANSMITTING POSITIONS OF INDICATING ORGANS

Filed Aug. 16, 1921   3 Sheets-Sheet 3

INVENTOR
Erich Roučka

Patented Dec. 4, 1923.

1,476,183

UNITED STATES PATENT OFFICE.

ERICH ROUČKA, OF BLANSKO, CZECHOSLOVAKIA.

DEVICE FOR TRANSMITTING POSITIONS OF INDICATING ORGANS.

Application filed August 16, 1921. Serial No. 492,862.

*To all whom it may concern:*

Be it known that ERICH ROUČKA, a citizen of Czechoslovakia, residing at Blansko, Czechoslovakia, has invented certain new and useful Improvements in Devices for Transmitting Positions of Indicating Organs (for which I have filed applications in Austria, June 21, 1918, and in Germany, July 12, 1918), of which the following is a specification.

This invention relates to apparatus for indicating, measuring, or recording the position of a movable member or variations in a value to be indicated, measured, or recorded, by means of periodically acting auxiliary power.

The primary object of the invention is to provide an apparatus of this character which is simple in construction and operation and which can be relied upon to accurately indicate, measure, or record the position of a movable member or variations in a value.

The invention consists in general of two spaced mechanisms movable relatively and together in the same or opposite directions, one of said mechanisms being periodically movable by auxiliary power, and a movable member the position of which is to be indicated arranged between said mechanisms and adapted to cooperate therewith to move one of said mechanisms into a position corresponding to the position of the said movable member upon each movement of the said periodically movable mechanism. The said movable member may be actuated in accordance with variations in a value to be indicated, measured, or recorded.

The space between said relatively movable mechanisms may be convergent in the direction of movement of the movable member so that the movement of one of said mechanisms upon each movement of said periodically movable mechanism is greater or smaller in accordance with the position of the said movable member.

Another object is to provide a brake device for temporarily holding the one of said mechanisms which is movable in accordance with the position of the said movable member in its indicating position, the said brake device being released upon each working stroke of the periodically movable mechanism before the latter cooperates with the said movable member and the other of said mechanism.

Further objects are to provide means associated with the movable mechanism the position of which corresponds to the position of said movable member for regulating or controlling by electric, pneumatic, hydraulic, or mechanical means other apparatus cooperating with the indicating, measuring, or recording apparatus, whereby the construction is simplified; to provide novel and improved means for remotely transmitting the variations in the value or the position of the movable member, and to obtain other results and advantages as may be brought out by the following description.

In the accompanying drawings a few examples of the execution of the arrangement according to the invention are represented.

Figure 3 diagrammatically illustrates another form of apparatus embodying the invention adapted for any kind of indication;

Figure 4 is a plan view taken on the line *b—b* of Fig. 3;

Figure 5 is a view in front elevation of one of the parts shown in Fig. 3;

Figure 7:
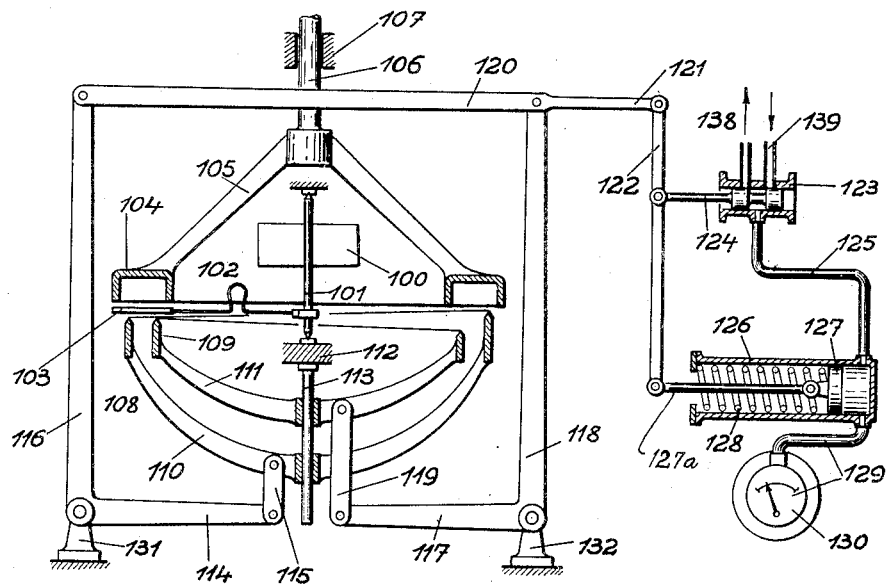
Figure 8:
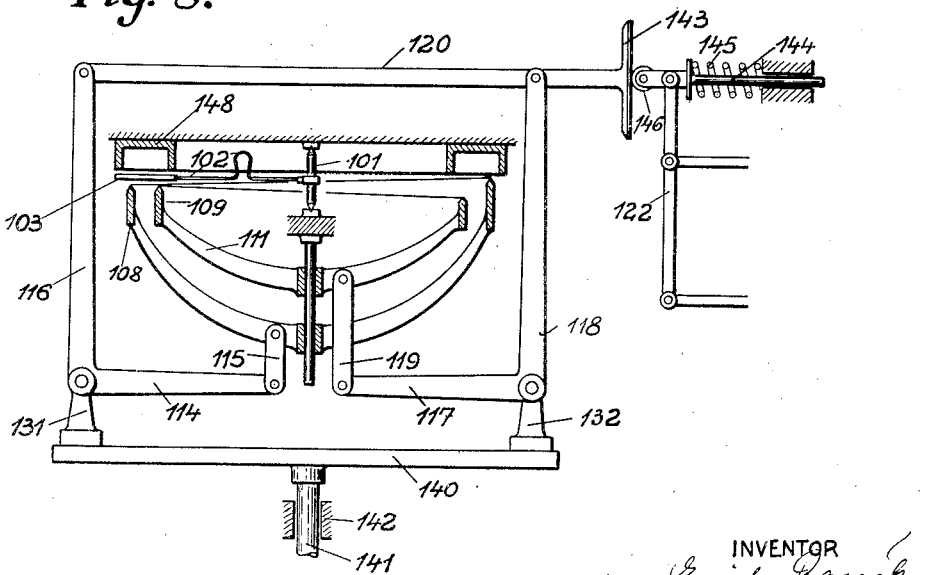

Figure 6 is a modified form of the part shown in Fig. 5;

Figure 7 diagrammatically illustrates another form of apparatus embodying the application of an auxiliary power for distance transmission, and Figure 8 is a view similar to Fig. 7 showing a modification.

Figure 1:
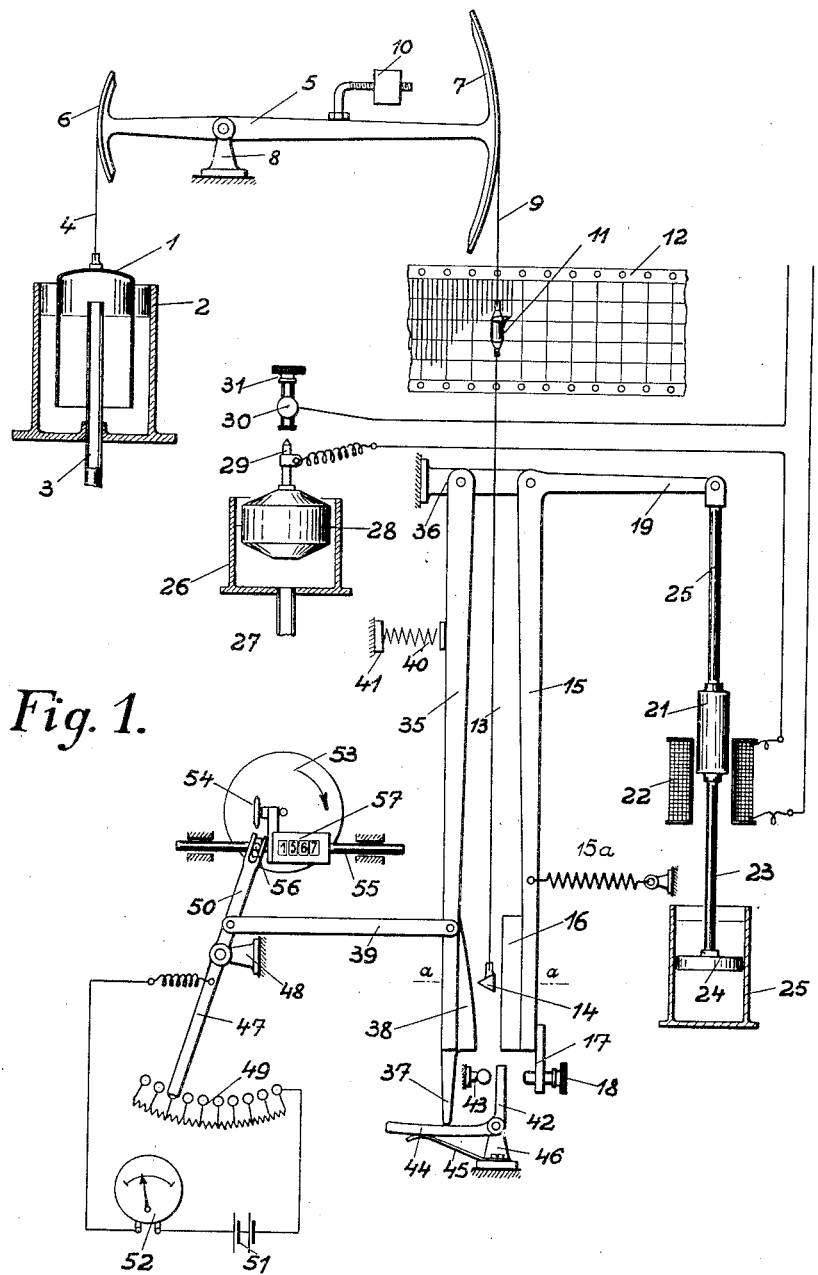
Figure 1 is a diagrammatic illustration of an apparatus embodying my invention attached to a gas analyzer, for instance carbonic acid.
Figure 2:
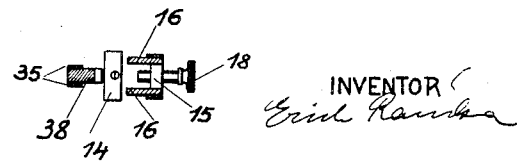
Figure 2 is a horizontal section taken on the line *a—a* of Fig. 1.

With reference to Figures 1 and 2 it is the floating body of a gas, for instance carbonic acid, which performs an upward and downward movement in a vessel 2. To the bell shaped floating body 1 the remaining smoke gases of a heating are conducted by a pipe 3 after absorption. According to the contents of the carbonic acid in the smoke gases the bell 1 performs a larger or smaller stroke, at which in each analysis the temporary highest position serves as the result of the measuring. The bell 1 acts through the medium of a metal band 4 upon a two-armed lever 5 which is carried on a bracket 8, and the lever 5 is provided with an adjustable counterweight 10 and a segment 7, on which latter hangs the member or link 11 effecting the indication supported by a metal band or equivalent 9. The member 11 indicates on a scale, or can be provided with a stylo or marking point, registering the result of the measuring upon a strip 12 moving past same.

By means of a band or equivalent 13 another link 14 is connected with the member 11 and thereby also with the segment 7, which performs in this manner the same movement as the member 11.

On the one side of the link 14 an oscillating arm 15 is arranged which has on its free end a fluted or channel part 16, Figure 2, which extends over the whole stroke length of the link 14. The depending arm 15 is connected or formed with an horizontal arm 19 to form a bell crank. At the free end of the arm 19 a rod or bar 25 of a core 21 of an electro-solenoid or magnetic coil 22 is linked. The core 21 is connected by a rod or bar 23 with a damping device consisting of a plunger 24 working in a dash port 25. A spring 15ᵃ tends to withdraw the core 21 from the solenoid 22.

After the termination of each analysis the liquid rises in a container 26, which is connected by a pipe 27 with the analyser, and raises the floating body 28, which closes the contact 29, 30, 31, so that the circuit is always closed when concluding each gas analysis. On the other side of the link 14 there is also positioned an oscillating arm 35 having a part 38 lying opposite the part 16 of the arm 15 inclined towards the direction of movement of the link 14 at its side which is towards the link 14. The arm 35 and its end 38 is pressed in the direction against the link 14 by a spring 40 supported against a fixed bearing 41. Instead of the obliquity of the part 38 part 16 can have an obliquity, or both parts can have an oblique form. The important factor is that the size of the intermediate space remaining between the parts 16 and 38 changes in the stroke direction of the link 14 moving within the same.

The part 16 obtains a periodical movement through the solenoid coil 22 and the spring 15ᵃ. At each working stroke the part 16 engages against the link 14 and moves same to come against the part 38 and move the arm 35, when the spring 40 is compressed. The amount of movement of the part 38 depends upon the position of the link 14 in the intermediate space between the parts 16 and 38, as well as upon the shape of this intermediate space, and is utilised for the distance indication of the movement of the bell 1.

The effect of the described arrangement is as follows:

After each analysis and according to the height of the stroke of the floating body 1 the part 14 moves to a certain position. At that moment the part 16 is moved against part 38; at first it carries with it the link 14 and then, on account of the obliquity and sooner or later according to the position of the link 14, the part 38. The extent of movement of the part 38 depends therefore on the position of the link 14 and the form of the obliquity. By that form, for instance by the suitable bending of the part 38, the division of the scale, which indicates the movement of the part 38, can be influenced in any manner desired. The movement of the part 38 can either serve as a measure, or it can be transmitted at a distance in a suitable manner such as electrically, for instance by an adjustable resistance 49, Figure 1, or pneumatically or hydraulically, Figure 7.

For instance, for the electric distance transmission the arm 35 is connected by a link 39 with a resistance lever 47 pivotally carried in a bracket 48 and inserts an electric resistance 49 into the circuit of a source of electric power 51. The size of the inserted resistance, or the resulting current strength forms a measure for the movement of the part 38 and can be read directly from the measuring apparatus 52. This arrangement can be connected with an independent counting device, (integrating device) and for this purpose a disc 53 is arranged, for instance driven by clockwork, on which disc a small counting wheel 54 is placed, which together with the counting mechanism 57 is fixed on the bar 55 and is moved by the upper arm 50 of the lever 47 touching a pin 56 of the bar 55 when the lever is displaced. The revolving speed of the small wheel 54 depends upon its distance from the center of the wheel 53, and this depends upon the extent of the movement of part 38. In this manner the extent of the movement of part 38, is directly registered (integrated) in the counting device 57.

In order to immediately liberate the link 14 after the measuring has taken place, the arm 35 is kept back by an extension 37 with the aid of a friction stop or something similar in its temporary displaced position, whilst part 16 is going back. This stop consists for instance of bell crank lever 42, 44 which is pivoted in a bracket 46 and is engaged by a spring 45 against the extension 37 of the arm 35 and brakes the latter. The arm 15 is provided with an extension piece 17 carrying an adjustable stop screw 18. At the end of the working stroke of the part 16 the screw 18 knocks against the arm 42 and rocks it together with the arm 44 against the action of the spring 45, whereby the arm 35 is liberated. A stop 43 limits the movement of the part 16.

By the stop device any load upon the measuring apparatus 1 and the parts connected with same is avoided. At each measuring the link 14 moves quite free. The described arrangement is particularly suitable for measuring apparatus which represent the results in long lines corresponding to the result of the measuring. In the case of such apparatus the arrangement according to this invention can also be used without a distance indicator. In this case the position of the auxiliary link 14 is for instance transferred directly to the indicator or registration apparatus which remain then in their position from one measuring to the next measuring, and only alter when one of the next measurings gives another result. One then obtains indications as in the case of other directly indicating or similar apparatus, which offers especially in the case of registering apparatus the advantages that a considerably less quantity of ink is used and the diagrams are clearer, so that they can be easily compared with other diagrams.

Figures 3 and 4 show an arrangement according to the invention with mechanical means of operation and direct indication. 64 is the indicator carried on a bearing 62, oscillating around the axis 61, of a device indicating any volume or effect, quality or quantity. 63 and 65 are, respectively, a bracket, and a pivotal support therefor for the mounting of the indicator. The indicator is for instance moved by a suitable bar or system 60 and has in the middle or is formed as a spring 66. Below the end 67 of the indicator 64 there is a U shaped counter bearing 70, preferably of a segment form of a length substantially equal to the stroke of the indicator 64. The counter-bearing 70 is fixed to an arm 68 pivotally mounted in a bracket 69. The arm 68 carries at its free end a roll 71 which rides on a cam disc 72. The cam 74 of the cam disc 72 raises periodically the counter resistance 70, which then falls back by its own weight.

Above the indicator 64 is a lever 82 pivotally carried in a bracket 83, which lever 82 carries a member 84 with a depending curved (see Figure 5) edge, which is positioned above the intermediate space between the two sides of the counter bearing 70. The lever 82 is connected on one side by a bar 85 with a damping cylinder 86 having a piston 87 hinged to a bracket.

At the end of the lever 82 a segment 81 is fixed, and a block is fixed to the end of a lever 77 pivotally carried in a bracket 78 and loaded with a spring 79, and the other end carries a roll 76 on which the cam 75 of a cam disc 73 acts and effects the release of the lever 82. The cams 74 and 75 are so arranged that they raise their levers 68 and 77 at the same time, as the movement of the bearing 70 takes place when the brake 80 is closed, the brake only being opened at the end of the stroke in order to make the opposite movement possible.

The lever 82 is connected by a link 89 with the arm 92 of an indicator 90 carried on a bracket 91, showing on a scale 93 and marking with a stylo or nib 94 on a register strip 95.

The effect of this device is as follows:—

At the periodical rise and fall movement of the arm 68 the indicator 67 is carried with it at each rise and raises accordingly the member 84 with the lever 82, a longer or shorter distance, when the movement of the lever 82 is transmitted to the indicator 90 which indicates and registers. In the raised position the arm 82 is held by the brake stop 80, pressing against the segment 81 and is only released at the end of the next stroke of the bearing 70, so that the indicator 90 only performs the movements absolutely necessary for the indication and registration. The division of the scale 93 is determined by the bending of the part 84 (Figure 5).

In some cases it may be advisable to be able to regulate the curvature of the part 38 (Figure 1) or 84 (Figure 5) or of a part acting together with same. For this purpose a flexible strip 94 (Figure 6) with links 93 for set screws 91 is provided and they can be adjusted in a guide 90 by means of adjusting nuts 92. By adjusting the screws 91 the curvature of 94 is altered.

In the apparatus shown in Figure 7, two rings, 108 and 109, which can be adjusted in a free manner, are supported by the arms 110 and 111 fixed on a shaft 113. The upper borders of these rings are arranged at an angle to the shaft 113 with opposite slope. Over the rings 108 and 109 moves the indicator 102, whose part 103 forms a bridge over the rings 108 and 109, and this indicator is fixed on a shaft 101, driven by a mechanism 100. Above the rings 108 and 109 and the indicator 103 there is a U shaped ring 104, which is connected by arms 105 with the shaft 106, situated in a bearing 107.

The arm 110 of the ring 108, is connected by a link 115 with a bell crank lever 114, 116 pivotally carried on a bracket 131, and the arm 111 of the ring 109 by a link 119 with another bell-crank lever 117, 118 pivotally carried in bracket 132. The upright arms 116 and 118 of these bell crank levers are pivotally connected by an arm 120, whose extension 121 is pivotally connected with a lever 122. To the lever 122 is attached at one part a valve rod 124 of a slide valve gear 123, and at lower part is attached a connecting rod 127ᵃ of a piston 127 working in a cylinder 126. In the cylinder 126 acts a pressure agent, flowing forward through the pipe 139 and outward through the pipe 138, according to the position of the valve 123. The cylinder 126 is connected to the cylinder 128 by a connecting pipe 125. The pressure when in the cylinder 126 is opposed by a spring 128. The pressure prevailing in the cylinder 128 is conducted by a pipe 129, which can be as long as desired, to the indicator apparatus 130 which may be for registration or integration.

The effect of the device described is as follows:

When moving the indicator 102 its part 103 comes above a place where the edges of the rings 108 and 109 are not level. The U shaped ring 104 moving upwards and downwards therefore meets the indicator 103 at first at the higher situated edge of the ring 108 or 109 and displaces the ring on its shaft 113 downwards. By the displacing of the one ring its bell crank lever is rocked and moves through the arm 120 also the other bell crank lever, which raises its ring until it meets with the indicator, when the movement stops.

Through the mutual movement of the rings 108 and 109 and the rocking of the bell crank levers a displacing of the arm 120 is effected and thereby also of the slide valve gear 123, 124, whereby the pressure in the cylinder 127 is altered in accordance with the position of the spring 128. The moving piston 127 of the indicator effects the return movement of the slide valve gear. The rings 108 and 109 together with the other parts remain self-acting in their temporary fixed position, so that no stop is required.

The arrangement according to Figure 8 differs from the arrangement just described only by the fact that the periodical movement is executed by means of an auxiliary power by the indicating mechanism itself. The bell crank levers 114, 116 and 117, 118 to be influenced by the rings 108 and 109 are pivotally carried on a platform 140 which executes a periodical rise and fall movement through a rod or bar 141 situated in a bearing guide 142, moving at the same time the rings 108 and 109 and displacing them on their shaft. The counter-bearing 148 is fixed. When raising the platform 140 the higher lying edge of the one ring pushes the indicator 103 to the counter bearing 148 and at the further lifting this ring is kept back, whereby its bell crank lever rocks and moves the arm 120 sideways, which also causes the other bell crank lever to rock so that the other ring is lifted until it comes against the indicator 103.

On the end of the arm 120 there is a vertical stop or guide plate 143 which presses against a roller 146, the roller being fixed at the end of a guide rod 144 which is controlled by a spring 145. The displacing of the arm 120 and thereby also of the roller 146 causes a movement of the lever 122, which is used for the indication, registration, integration or distance transmission, or can effect the regulation of further volumes or processes.

It will be observed that in all forms of the invention described, the member movable in accordance with variations in the value being transmitted may freely move to any extent in accordance with any variation of the value without restriction or interference by either the periodically movable mechanism or the mechanism movable in accordance with the position of the said movable member. Furthermore, the member movable in accordance with the position of the movable member is actuated instantaneously and directly upon each movement of the periodically movable mechanism in one direction into a position corresponding to the position of the movable member and the variation in the value causing said position of the movable member.

The two spaced relatively movable mechanisms referred to in the appended claims are the periodically movable mechanism, for instance the members 15, 68, 104, etc., and the members movable by cooperation of said periodically movable mechanism and the movable members, for instance the levers 35 and 82 and the rings 108 and 109 with their associated parts. The movable members are the parts 14, 67 and 103.

It is clear that the invention is not exhausted by the examples described, but that there are several other constructions possible, without departing from the scope of the invention.

What I do claim as my invention and desire to secure by Letters Patent is:—

1. An indicating, measuring, or recording apparatus comprising two spaced relatively movable mechanisms at least one of which is periodically movable by auxiliary power, and a member freely movable between said mechanisms in accordance with variations in a value to be indicated in a plane at right angles to the direction of the relative movement of said mechanisms, said member being adapted to cooperate with said two mechanisms upon each movement in one direction of said periodically movable mechanism to effect a movement of one of said mechanisms into a position corresponding to the value being indicated.

2. An indicating, measuring, or recording apparatus comprising two spaced relatively movable mechanisms at least one of which is periodically movable by auxiliary power, and a member freely movable between said mechanisms in accordance with variations in a value to be indicated in a plane at right angles to the direction of the relative movement of said mechanisms, said member being adapted to cooperate with said two mechanisms to directly transmit any variation in the value being transmitted to one of said mechanisms upon each movement in one direction of said periodically movable mechanism.

3. An indicating, measuring, or recording apparatus comprising two spaced mechanisms movable relatively and together, one being periodically actuated by auxiliary power, and a member freely movable in accordance with variations of a value to be indicated between said mechanisms in a plane at substantially right angles to the direction of movement of said mechanisms and also adapted to be moved in the same direction as said mechanisms, said member cooperating with said periodically actuated mechanism upon each movement thereof toward the other of said mechanisms to move said second-mentioned mechanism into a position corresponding to the value being indicated.

4. An indicating, measuring, or recording apparatus comprising two spaced relatively movable mechanisms at least one of which is periodically movable by auxiliary power, and a member freely movable between said mechanisms in accordance with variations in a value to be indicated in a plane at right angles to the direction of the relative movement of said mechanisms, said member being adapted to cooperate with said two mechanisms to directly transmit any variation in the value being transmitted to one of said mechanisms upon each movement in one direction of said periodically movable mechanism, the space between said mechanisms in which said movable member operates being of varying width in the direction of movement of said movable member whereby the position of said last-mentioned mechanism varies in accordance with the position of said movable member and serves as a measure of the value being transmitted.

5. An indicating, measuring, or recording apparatus comprising two spaced relatively movable mechanisms at least one of which is periodically movable by auxiliary power, and a member freely movable between said mechanisms in accordance with variations in a value to be indicated in a plane at right angles to the direction of the relative movement of said mechanisms, said member being adapted to cooperate with said two mechanisms upon each movement in one direction of said periodically movable mechanism to effect a movement of one of said mechanisms, the adjacent surfaces of one or both of said mechanisms over which said movable member operates being inclined to form the space between said mechanisms of varying widths in the direction of movement of said movable member whereby the position of said last-mentioned mechanism varies in accordance with the position of said movable member and serves as a measure of the value being transmitted.

6. An indicating, measuring, or recording apparatus comprising two spaced mechanisms movable relatively and together, one being periodically actuated by auxiliary power, and a member freely movable in accordance with variations of a value to be indicated between said mechanisms in a plane at substantially right angles to the direction of movement of said mechanisms and also adapted to move in the same direction as said mechanisms, said member cooperating with said periodically actuated mechanism upon each movement thereof toward the other of said mechanisms to move said second-mentioned mechanism into a position corresponding to the value being indicated, the space between said mechanisms in which said movable member operates being of varying width in the direction of movement of said movable member whereby the position of said last-mentioned mechanism varies in accordance with the position of said movable member and serves as a measure of the value being transmitted.

7. An indicating, measuring, or recording apparatus comprising two spaced mechanisms movable relatively and together, one being periodically actuated by auxiliary power, and a member freely movable in accordance with variations of a value to be indicated between said mechanisms in a plane at substantially right angles to the direction of movement of said mechanisms and also adapted to move in the same direction as said mechanisms, said member cooperating with said periodically actuated mechanism upon each movement thereof toward the other of said mechanisms to move said second-mentioned mechanism into a position corresponding to the value being indicated, the adjacent surfaces of one or both of said mechanisms over which said movable member operates being inclined to form the space between said mechanisms of varying widths in the direction of movement of said movable member whereby the position of said last-mentioned mechanism varies in accordance with the position of said movable member and serves as a measure of the value being transmitted.

8. An indicating, measuring, or recording apparatus comprising a member movable in a plane in accordance with variations in a value to be transmitted and also adapted to be moved transversely out of said plane, two spaced mechanisms one at each side of said plane and movable relatively and together in the same and opposite directions at substantially right angles to said plane of movement of said movable member, one of said mechanisms being periodically movable by auxiliary power, said movable member being adapted to cooperate with said mechanisms to effect a movement of one thereof into positions corresponding to variations in the value being transmitted.

9. An indicating, measuring, or recording apparatus comprising a member movable in a plane in accordance with variations in a value to be transmitted and also adapted to be moved transversely out of said plane, two spaced mechanisms one at each side of said plane and movable relatively and together in the same and opposite directions at substantially right angles to said plane of movement of said movable member, one of said mechanisms being periodically movable by auxiliary power, said movable member being adapted to cooperate with said mechanisms to effect a movement of one thereof into positions corresponding to variations in the value being transmitted, the space between said mechanisms being convergent in the direction of movement of said movable member whereby the positions of said last-mentioned mechanism vary in accordance with the positions of said movable member and serve as a measure for the variations in the value being transmitted.

10. A device for transmitting the position of a deflected member, comprising a member the deflection of which is variable according to the variation of a condition to be transmitted, means periodically actuated by an auxiliary power for effecting a movement of a second means in a new position according to the position of said member, a brake member holding the second-mentioned means in its position, and a member for lifting the brake member to permit actuation of said second-mentioned means by the first-mentioned means.

11. The apparatus set forth in claim 1 in which a brake member is provided for automatically holding the last-mentioned mechanism in each indicating position after each movement of said periodically movable mechanism, said brake member being automatically released on the next movement of said periodically movable mechanism.

12. The apparatus set forth in claim 8 in which a brake member is provided for automatically holding the last-mentioned mechanism in each indicating position after each movement of said periodically movable mechanism, said brake member being automatically released on the next movement of said periodically movable mechanism.

13. A device for transmitting the position of a deflected member, comprising a member the deflection of which is variable according to the variation of a condition to be transmitted, means periodically actuated by an auxiliary power for effecting a movement of a second means in a new position corresponding to the position of said member, and means associated with said second-mentioned means for controlling any quantity or quality cooperating with the device.

14. The apparatus set forth in claim 1 in which means is associated with the last-mentioned one of said mechanisms for controlling any quantity or quality cooperating with the apparatus.

15. A device for transmitting the magnitude of the oscillation of an oscillating member, the magnitude of oscillation of which is variable according to the variation of the condition to be transmitted, comprising an oscillating member, means periodically actuated by an auxiliary power for effecting upon each actuation thereof a movement of a second means in a new position corresponding to the magnitude of the oscillation of said member, and means associated with said second-mentioned means for controlling any quantity or quality cooperating with the device.

In testimony whereof I have hereunto set my hand in presence of two subscribing witnesses.

ERICH ROUČKA.

Witnesses:
ING. KAREL KUTHAN,
ING. VEICLAN PLASFER.